Oct. 2, 1934.  R. JOHN  1,975,426
AIR ACTIVATOR
Filed July 18, 1932
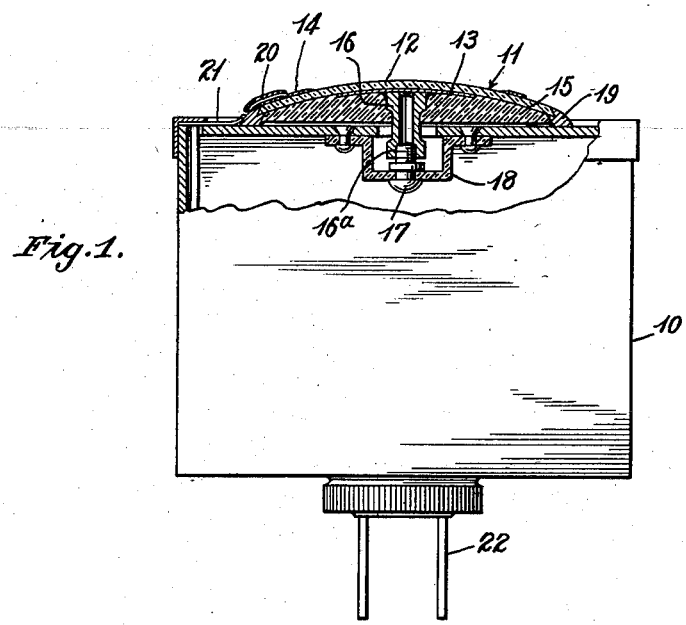
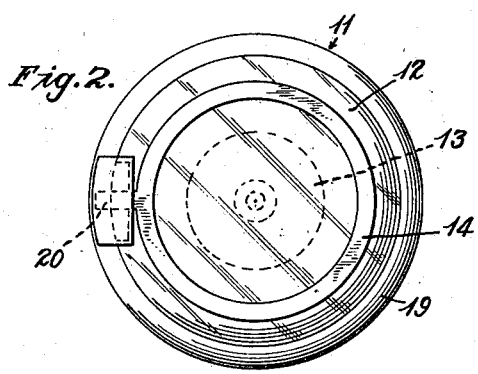
Inventor
Robert John
By Bacon Thomas
Attorneys Patented Oct. 2, 1934

1,975,426

UNITED STATES PATENT OFFICE 1,975,426

AIR ACTIVATOR

Robert John, New York, N. Y.

Application July 18, 1932, Serial No. 623,227

2 Claims. (Cl. 204—32)

This invention relates to a method and apparatus for purifying atmospheric air through slow combustion or oxidation whereby deodorization is effected and bacterial growth retarded. It comprises a device and a process of purification capable of use wherever air purification is desired over a range extending from closed spaces of two or three cubic feet, as, for example, food compartments of refrigerators, to large public halls containing hundreds of thousands of cubic feet of air. It is applicable to air purification also in homes, offices, hospitals, hotels, hallways, toilets, elevators, railway cars and other public vehicles.

An object of the invention, among others, is to economically purify the air without the production of disagreeable, ill-smelling, harmful by-products in the process; which can be used continuously with requiring attention or replacement and which may be readily installed and operated at low cost.

An important object of the invention is based upon the conception that by regulating the character of a silent electrical discharge, more specifically hereinafter described, it is possible to produce a molecular disturbance in the oxygen in the air capable of acting effectively as a deodorant and also as a bactericide but free from any traces whatever of actual ozone as determined by the standard analytical methods known to the art.

Another object of the invention is to provide means whereby the electrical discharge device may be varied whereby to regulate, in a predetermined fashion, the quantities of ozone in the treated air, according to the need therefor or according to the moisture or temperature conditions of the air being treated.

A still further object of the invention is to provide a device which is compact, small in character, and free of gas-entrapping pockets, whereby substantial retreatment of the air is positively prevented with a consequent avoidance of the formation of nitrous oxides.

In my copending application Serial No. 585,101, filed January 6, 1932, for instance, I have described an improved means of producing ozone by silent electrical discharge. The present invention departs from that of my copending application in that, although I may employ the same type of silent discharge, it accomplishes its result through disturbance of the oxygen of the air without, however, forming undesirable quantities of ozone. My invention provides a means whereby the entire effect may be limited to electrification or molecular disturbance free from ozone formation; or whereby, at will, a little ozone, or as much as may be desired, may be formed at the same time. I have discovered that when atmospheric air is subjected to the silent electrical discharge, three distinct phases or stages may be encountered, to-wit:

(1) If the intensity of the discharge be much diffused, it is possible to produce molecular disturbance in the oxygen of the air capable of acting effectively as a deodorant and as a bactericide but free from any traces whatever of actual ozone as determined by the standard analytical methods known to the art;

(2) By concentrating the area of the discharge and increasing its intensity it is possible to create, in addition to the molecular disturbance referred to last above, substantial measurable quantities of ozone, which quantities may be increased or decreased at will by the structure and process hereinafter described; and (3) If the discharge be still further concentrated and the structure of the device be such as to contain entrapping pockets whereby substantial retreatment of the ozonized air is produced, the result is to form ozone of such chemical activity as to attack the nitrogen of the air whereby oxides of nitrogen are thereby formed and may be identified and measured by standard analytical means.

It is well known that oxides of nitrogen are ill-smelling, acrid and may even be harmful from the physiological standpoint, that once formed they may persist in the treated air to such an extent as to become more deleterious than the conditions they were intended to remedy. It is also true that even pure ozone has a distinctive odor which in sufficient concentration may, in some uses, be objectionable even when free from the oxides of nitrogen.

I have observed, however, that when the electrical disturbance is stopped short of the formation of actual ozone, as determined by known means, the molecularly disturbed oxygen possesses high chemical activity without having any smell of its own or other objectionable characteristics. It is therefore the purpose of the present invention to provide means whereby the percentage of the three effects of the electrical discharge noted above may be regulated and/or controlled at will to produce any desired result.

For a more detailed understanding of the invention, reference will be had to the accompanying drawing wherein Fig. 1 is a side elevation partly in section of one embodiment of the device;

Fig. 2 is a plan of the activating element shown in Fig. 1;

Fig. 3 is a sectional view of the element disclosed in Fig. 2 with a lesser spacing of electrodes; and Fig. 4 is a view similar to Fig. 3 with the electrodes spaced as disclosed in my copending application Serial No. 619,569, filed June 27, 1932.

Referring more particularly to the drawing, 10 indicates a transformer housing upon which an air activating element 11 is mounted. The air activating element comprises a circular dielectric plate 12 upon the inner surface of which the metallic foil electrode 13 is secured. This electrode is preferably circular in shape as shown in Fig. 2 and is positioned concentric with the dielectric plate 12. An annular metal foil electrode 14 is secured to the outer surface of the dielectric plate 12 and is preferably concentric with the inner electrode 13. As shown, all portions of the outer electrode 14 are spaced laterally from the outer edge of the inner electrode 13.

The dielectric plate 12 is preferably concavo-convex in formation and the concave portion may be filled with a dielectric cement 15. A connector 16 extends from the inner electrode 13 through the dielectric cement 15 and is provided with a screw threaded connection 16a with a member 17 mounted upon an insulating member 18 secured to the transformer case 10. The connector 16 serves to retain air activating element 11 upon the transformer case.

The dielectric plate 12 may be provided with a metallic rim 19 which is in electrical connection with the outer electrode 14 through the extension 20 upon the outer electrode 14. The metallic rim 19 is also in electrical contact with the transformer case 10 through the connector 21.

The transformer, not shown, is positioned within the transformer case 10 and has one terminal of its secondary winding in electrical contact with member 17 and the other terminal of its secondary in electrical contact with the transformer casing 10. The primary winding of the transformer has its terminals connected to the conventional plug 22, which is adapted to be inserted into a conventional electrode fixture. Upon insertion of the plug 22 into an electrical fixture, a voltage is impressed across the electrodes 13 and 14.

As described later in the specification, the inner electrode may be $\frac{3}{4}$ of an inch in diameter and the outer electrode 14 may be spaced $\frac{1}{4}$ of an inch from the inner electrode 13 to produce (under certain atmospheric conditions) no ozone whatever, the discharge producing only a molecular disturbance of the oxygen of the air. A suitable operating potential across the electrodes is about 5000 volts, 60 cycle A. C.

Fig. 3 shows a portion of an air activating element similar to that shown in Figs. 1 and 2 wherein an inner electrode 13a is provided exactly similar to the electrode 13 shown in Figs. 1 and 2. An outer electrode 14a is secured to the outer surface of the dielectric plate 12a and is similar to the electrode 14 of Figs. 1 and 2. However, the electrode 14a is spaced laterally a lesser distance from the electrode 13a than is the electrode 14 from the electrode 13 in Figs. 1 and 2.

As explained later in the specification (under certain atmospheric conditions), a spacing of $\frac{1}{8}$ of an inch between the electrodes 13a and 14a is sufficient to stop the formation of ozone and produce only a molecular disturbance of the atmosphere.

Fig. 4 discloses a portion of an air activating element provided with electrodes 13b and 14b secured to the dielectric plate 12b. The lateral spacing of the electrodes is less than that shown in Fig. 3. As also explained later in the specification, a spacing of $\frac{1}{16}$ of an inch (under certain atmospheric conditions) produces pure ozone without the formation of nitrogen oxides.

It will be noted that in all of the air activating elements shown, the electrical discharge takes place from the inner electrode through the dielectric plate, the open atmosphere surrounding the outer surface of the air activating element to the outer electrode. The outer surface of the air activating element is small and no air-entrapping pockets are present. The air is therefore not retained within the field of the air activating zone and is therefore not subjected to retreatment. Also it has been found that the electrical discharge is of such a nature as to expel the treated air from the air activating zone whereby retreatment is substantially prevented.

As stated above, the electrical discharge and treatment of the air take place in the open atmosphere. By the term "open atmosphere" is meant the atmosphere of a room or of any container which is relatively large with respect to the size of the air activating element and the spacing between the electrodes as, for example, a refrigerator compartment.

In my earlier filed application, Serial No. 585,101, filed January 6, 1932, as well as in a copending application entitled "Ozonizing element", Serial No. 619,569, filed June 27, 1932, I have disclosed an ozonizing device comprising, briefly, a transformer and an ozonizing element designed to project its electrical discharge into the air being treated. By taking a transformer and an ozonizing element of the type there described, I have discovered that I am able to vary the output merely by changing the outer electrode of the ozonizing element. Thus, for example, if a wire mesh is employed as the outer electrode, high percentages of oxides of nitrogen are produced. If electrodes of the type disclosed in my applications Serial No. 585,101 or Serial No. 619,569 are used, little or no oxides of nitrogen are produced, but high percentages of pure ozone are produced.

However, by increasing the lateral spacing apart between the inner and outer electrodes from the position shown in Fig. 1 to the position shown in Fig. 4, I am able to prevent the formation of any measurable quantities of ozone, the output being limited to the molecular disturbance of the atmospheric oxygen without actual molecular rearrangement. In my later filed application, above referred to, there is described an under electrode consisting of a metallic disc $\frac{3}{4}$ of an inch in diameter and an outer electrode in the form of a ring spaced apart therefrom $\frac{1}{16}$ of an inch.

If, by using the same type of element and transformer, I space my outer electrode $\frac{1}{4}$ of an inch away from my under electrode, I produce (under certain atmospheric conditions) no ozone whatever, the discharge being limited to the aforesaid electrical breeze molecular disturbance.

With regard to the words "under certain atmospheric conditions", it is pointed out that the moisture content of the air has a measurable influence on the formation of ozones and the general characteristic of the output of an apparatus of this type. Thus with the outer ring spaced ¼ of an inch laterally away from the under disc, I produce no ozone in air containing three grains of moisture to the cubic foot, but measurable traces of ozone are produced in completely dehydrated air. The last described appliance therefore would be suitable for producing molecular disturbance free from ozone in a refrigerator food compartment, the temperature of which precludes an excess of three grains of moisture per cubic foot of air, the moisture content of the food being stored therein also precluding the possibility of perfectly dry air.

From the foregoing, it will be observed that by merely spacing apart the outer electrode from the under one, the output of the element may be varied and regulated to give any desired output under specified operating conditions. Thus, by way of explanation, the ozonizing element described in my last named copending application is designed to produce pure ozone at 70° F. with a relative humidity of 50%, under which conditions there are approximately eight grains of water in each cubic foot of air. Under these conditions, as the lateral spacing apart is increased from $\frac{1}{16}$ of an inch to ⅛ of an inch, the formation of ozone is stopped, but I obtain a proportional increase in molecular disturbance through the electrical breeze.

From the foregoing it will be observed by one skilled in the art that I may readily and easily adjust the character of the ozone output of an element to any set of prescribed conditions whereby to effect a change in the outer electrode. Obviously, too, larger or smaller electrodes, or greater or lesser voltage, or thicker or thinner dielectric plates than those described may be substituted without departing from the scope of this invention which comprehends the conception of governing the output of the ozonizing element to meet a required condition by means of varying the size, shape and location of two electrodes cemented to opposite sides of a single dielectric plate.

A specific instance of the value of this invention is found in its use in food compartments of ice boxes and refrigerators where continuous operations of the air purifier is desired as against intermittent operation as described in my copending application, Serial No. 599,047, filed March 15, 1932. As pointed out therein, the formation of even pure ozone free from oxides of nitrogen leaves its own objectionable odor and taste if carried on continuously, and the object of the invention therein disclosed was to provide means for intermittent operation to prevent over-ozonization. The concept of the present invention, however, if constructed and arranged as above described, may be used in such a manner as to form no ozone whatever under the temperatures and humidities found in refrigerators and is capable of continuous use in food compartments of refrigerators without reproducing any deleterious or objectionable results. Thus, in connection with refrigerators other than those which are mechanically operated, as ice boxes, and even in electrically operated refrigerators, it possesses certain distinctive advantages under a wide range of uses.

It will be apparent to those skilled in the art that various changes in the construction illustrated may be made without departing from my invention, as comprehended by the following claims:

1. The method of activating air which comprises forming an electrical discharge in a zone free from air entrapping pockets, dissipating the thus treated air by the electrical discharge and maintaining the intensity of said discharge below a value sufficient to form substantial quantities of ozone.

2. The herein described method of activating air, the steps which comprise subjecting the air in the open atmosphere to an electrical discharge projected from a smooth non-gas entrapping surface, the voltage impressed being sufficient to economically activate the air but insufficient to form undesirable quantities of ozone or nitrous oxides, and dissipating by the electrical discharge the air thus treated, to prevent substantial retreatment thereof.

ROBERT JOHN.